US012381334B2

(12) United States Patent
Guntupalli et al.

(10) Patent No.: US 12,381,334 B2
(45) Date of Patent: Aug. 5, 2025

(54) ANTENNA DEVICE, ARRAY OF ANTENNA DEVICES, AND BASE STATION WITH ANTENNA DEVICE

(71) Applicant: HUAWEI TECHNOLOGIES CO., LTD., GuangDong (CN)

(72) Inventors: Ajay Babu Guntupalli, Munich (DE); Juan Segador Alvarez, Munich (DE); Bruno Biscontini, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 18/182,662

(22) Filed: Mar. 13, 2023

(65) Prior Publication Data

US 2023/0223709 A1 Jul. 13, 2023

Related U.S. Application Data

(63) Continuation of application No. PCT/EP2020/075613, filed on Sep. 14, 2020.

(51) Int. Cl.
*H01Q 21/26* (2006.01)
*H01Q 9/28* (2006.01)

(52) U.S. Cl.
CPC ............. *H01Q 21/26* (2013.01); *H01Q 9/285* (2013.01)

(58) Field of Classification Search
CPC .......... H01Q 21/26; H01Q 21/28; H01Q 1/29; H01Q 1/30; H01Q 9/285; H01Q 25/00
See application file for complete search history.

(56) References Cited

U.S. PATENT DOCUMENTS

| | | | | |
|---|---|---|---|---|
| 9,263,798 | B1 * | 2/2016 | Piazza | H01Q 21/29 |
| 9,859,611 | B2 | 1/2018 | Jones et al. | |

(Continued)

FOREIGN PATENT DOCUMENTS

| | | | |
|---|---|---|---|
| CN | 104143700 | A | 11/2014 |
| CN | 104934700 | A | 9/2015 |

(Continued)

OTHER PUBLICATIONS

Halim Boutayeb et al., "Dual Polarized Dual Band Collocated Beam Switching Antennas for WLAN Applications," 202 14th European Conference on Antennas and Propagation (EuCAP), Jul. 8, 2020; 5 total pages.

*Primary Examiner* — Jimmy T Vu
(74) *Attorney, Agent, or Firm* — Rimon PC

(57) ABSTRACT

An antenna device comprises a base plate, a first radiator, a first balun and a second radiator. The base plate has a substantially planar shape. The first radiator is configured to radiate a first electromagnetic signal in a first frequency band. The first balun extends along a first axis between the base plate and the first radiator. The first axis is oriented perpendicular to the base plate and the first radiator. The first balun is arranged in order to support the first radiator. The second radiator is configured to radiate a second electromagnetic signal in a second frequency band. The second radiator includes one or more planar structures extending along the first axis and arranged between the base plate and the first radiator. The first and second radiators operate in different frequency bands without any interference to form a compact multiband antenna device.

20 Claims, 5 Drawing Sheets

(56) References Cited

U.S. PATENT DOCUMENTS

| | | | | |
|---|---|---|---|---|
| 2005/0237258 | A1* | 10/2005 | Abramov | H01Q 21/205<br>343/834 |
| 2011/0165915 | A1* | 7/2011 | Kim | H04M 1/0266<br>345/173 |
| 2018/0342807 | A1* | 11/2018 | Watson | H01Q 9/0421 |
| 2022/0045429 | A1* | 2/2022 | Harel | H01Q 5/48 |

FOREIGN PATENT DOCUMENTS

| | | | |
|---|---|---|---|
| CN | 107078404 | A | 8/2017 |
| CN | 108199146 | A | 6/2018 |
| CN | 207624912 | U | 7/2018 |
| CN | 110323553 | A | 10/2019 |
| CN | 111029756 | A | 4/2020 |
| CN | 111384594 | A | 7/2020 |
| EP | 1496569 | B1 | 8/2016 |
| EP | 3232504 | A1 | 10/2017 |
| EP | 3535806 | A1 | 9/2019 |
| WO | 03065505 | A1 | 8/2003 |

* cited by examiner

ANTENNA DEVICE, ARRAY OF ANTENNA DEVICES, AND BASE STATION WITH ANTENNA DEVICE

CROSS-REFERENCE TO RELATED APPLICATIONS

This application is a continuation of International Application No. PCT/EP2020/075613, filed on Sep. 14, 2020, the disclosure of which is hereby incorporated by reference in its entirety.

TECHNICAL FIELD

The present disclosure relates generally to the field of telecommunication devices, and more specifically, to an antenna device, an array of antenna devices, and a base station that includes one or more antenna devices.

BACKGROUND

In recent times, the rapid development of various wireless communication systems can be attributed to the development of innovative antenna technologies including diversity antennae, reconfigurable antennae and so forth. Such systems operate within different frequency bands and consequently require separate radiating elements for each frequency band. Typically, to provide dedicated antennae for such systems, a plurality of antennae may be required at each site. Thus, there exists a dire need for a compact antenna as a single structure capable of servicing all required frequency bands. Despite an increase in the number of required frequency bands as well as an increase in the number of users (i.e. terrestrial mobile users), there is a limitation associated with the number of antennae that can be installed in a specific sector. Typically, there is a strict requirement of one antenna per sector (in some cases, at most two antennae per sector). Moreover, there are limitations associated with a size of a given antenna that can be installed at installation sites. For example, in order to facilitate certain activities related to telecommunication services, such as site acquisition or reuse of current mechanical support structures at the installation sites, it is expected that the form factor and the wind-load of any new antennae that are to be installed should be similar and comparable to existing antennae.

In certain scenarios, neither network densification (i.e. addition of new sites) may be allowed nor installation of any additional conventional antennae at the installation sites. Moreover, a significant increase in the size (i.e. dimensions) of the conventional antenna is also not preferred or allowed. Thus, in such scenarios, it becomes technically challenging to design and develop an adequate antenna structure without increasing complexity. Currently, certain attempts have been made to design and develop an antenna device which may integrate one or more radiators and operate in one or more frequency bands. However, conventional antenna devices have a technical problem of high structural complexity, which also increases the complexity in manufacturing of such conventional antenna devices. In an example, a conventional antenna device may have two radiators (e.g. dual-band radiators) integrated into one conventional antenna device. However, such conventional antenna device needs multiple probes to feed current to the radiators. Such probes may be required to be soldered to a printed circuit board (PCB), thereby increasing the number of parts and the complexity of the conventional antenna device. Typically, some conventional antenna devices employ several coaxial cables to feed current to the different radiators of the conventional antenna device, thereby significantly increasing the complexity. Moreover, such conventional antenna devices are resource intensive, i.e. require greater manpower, skill or effort and time for installation thereof. Typically, an increased number of parts results in more contact points, and to further electrically couple such contact points, a greater number of soldering joints are required. Additionally, for conventional antenna devices operating with more than one frequency band, a glitch-less and interference-free communication always remain a challenge.

Therefore, in light of the foregoing discussion, there exists a need to overcome the aforementioned drawbacks associated with conventional antenna devices.

SUMMARY

The present disclosure seeks to provide an antenna device, an array of antenna devices, and a base station that includes one or more antenna devices. The present disclosure seeks to provide a solution to the existing problem of structural and manufacturing complexities and installation efforts associated with conventional antenna devices. An aim of the present disclosure is to provide a solution that overcomes at least partially the problems encountered in the prior art and provide an improved antenna device that is easily installable and having lower structural and manufacturing complexities. Further, the antenna device of the present disclosure can operate within multiple frequency bands having improved performance.

The object of the present disclosure is achieved by the solutions provided in the enclosed independent claims. Advantageous implementations of the present disclosure are further defined in the dependent claims.

In a first aspect, the present disclosure provides an antenna device comprising a base plate having a substantially planar shape. The antenna device also comprises a first radiator configured to radiate a first electromagnetic signal in a first frequency band. The first radiator has a substantially planar shape parallel to the base plate. The antenna device further comprises a first balun extending along a first axis between the base plate and the first radiator. The first axis is perpendicular to the base plate and the first radiator. The first balun is arranged to support the first radiator. The antenna device also comprises a second radiator configured to radiate a second electromagnetic signal in a second frequency band. The second radiator has one or more planar structures extending along the first axis and arranged between the base plate and the first radiator.

The antenna device of the present disclosure is a low profile, light weight, compact antenna device that integrates more frequency bands and maintains a small form factor. The antenna device is compact in size and has lower complexity (i.e. the structural and manufacturing complexities) as compared to a conventional antenna device. For example, the antenna device does not use parts, like probes or cables, to connect feeding lines, thereby reducing the overall complexity for the antenna device. Further, the architecture of the antenna device allows integration of a high band antenna element and a low band antenna element on a single printed circuit board (PCB), i.e. on the base plate. Correspondingly, the high band and low band antenna elements have their feeding lines printed or etched on the PCB. Consequently, the number of soldering joints required for the installation of the antenna device are reduced. Furthermore, the architecture of the antenna device is suitable for implementation of further split architectures in multi-band antenna devices, i.e. having more than two frequency bands. Moreover, the relative positioning of the radiating elements (such as the first radiator, the second radiator) simplifies the arrangement of the antenna device by having a lower number of moving parts and hence having a more compact design or structural integrity. Thereby, reducing the overall structural and manufacturing complexities associated with the antenna device, which in turn reduces the installation effort in terms of time and cost and from a labor perspective. In an example, for the installation of the antenna device, initially the second radiator (integrated with the first balun) is soldered to the base plate and thereafter the first radiator is soldered to the first balun.

In an implementation form, the second radiator is integrally formed with the first balun.

The second radiator is formed as a monolithic structure with the first balun, thereby reducing the number of moving parts and the soldering joints of the antenna device. This in turn provides compactness and improved structural integrity to the antenna device.

In a further implementation form, the second radiator comprises a grounding capacitor arranged for capacitive grounding of the second radiator.

In a further implementation form, the grounding capacitor is formed from a conductive path extending across one or more of the planar structures of the second radiator.

The grounding capacitor act as a filter for the high frequency feed in the antenna device, i.e. to avoid any resonance in the multi-band. Typically, the grounding capacitor enables reduced electric field susceptibility (that may be caused due to the high frequency feed), which in turn reduces interference on the output signals of the antenna device. In other words, the grounding capacitor enables the antenna device to perform glitch-less and interference free communication. Further, by virtue of using the grounding capacitor as a conductive path, the overall complexity of the antenna device is also reduced.

In a further implementation form, a second balun is integrally formed with the second radiator.

The second radiator is formed as a monolithic structure with the second balun, thereby reducing the number of moving parts and the soldering joints of the second radiator. Typically, the integrated second balun provides overall compactness and improved structural integrity to the antenna device.

In a further implementation form, the second radiator is formed from any one of a printed circuit board, a board with metal foil deposit, a folded metal sheet or a molded interconnect device.

The implementation of the second radiator in such a manner makes the antenna device compact and reduces the structural complexity and installation effort.

In a further implementation form, the first balun is formed in a cross configuration of two intersecting planar structures.

The cross configuration of the first balun enables effective support of the first radiator on the first balun. Moreover, the cross configuration of the first balun simplifies the connection with the feeding lines and further enables the first radiator to be free of any features, such as any slots, connections, and the like. This enables improved performance of the antenna device in terms of signal interference and provides a capability to the antenna device to accommodate one or more radiators below the first radiator without degrading the performance.

In a further implementation form, the first balun comprises one or more feed lines for the first radiator.

The feed lines for the first radiator are integrated with the first balun, to preclude a need for separate feed lines for the first radiator, which reduces structural complexity for the antenna device. This also helps in reducing installation effort.

In a further implementation form, the second radiator comprises a plurality of radiating arms, each including a first part extending radially outwards away from the first axis, and a second part extending from the outer extent of the first part in a direction parallel to the first axis.

The radiating arms of the second radiator, including the first part and the second part, form a bent L-shaped structure and enables a compact arrangement of the radiating arms in the second radiator, and significantly contributes to reduce the overall size of the antenna device. The radiating arms are arranged in the planar structures of the second radiator which allows the second radiator to occupy a smaller footprint with reduced scattering effect on the first radiator.

In a further implementation form, the first radiator comprises one or more co-planar structures.

The one or more co-planar structures form a single planar structure for the first radiator, which allows the first radiator to be effectively supported by the cross configuration of the first balun. Further, the planar structure of the first radiator holds its functional components thereon in a single plane, which reduces overall functional, structural and manufacturing complexity associated with the first radiator.

In a further implementation form, at least the base plate and the first radiator are formed from a printed circuit board.

The base plate and the first radiator formed from the printed circuit board reduces the overall manufacturing complexity and installation for the antenna device. Also, this enables reduced overall complexity associated with the designing of the antenna device required to operate in more than one frequency band.

In a further implementation form, the second frequency band does not overlap with the first frequency band.

The second frequency band does not overlap with the first frequency band to avoid interference or scattering impact of the signals during operation of the antenna device.

In a further implementation form, the second frequency band is higher than the first frequency band.

The second frequency band is higher than the first frequency band to enable the antenna device to operate in two different frequency bands or a dual-band configuration of the antenna device. This makes the antenna device of the present disclosure efficient, such that instead of two different antenna devices, the same antenna device can be used for specific tasks or locations where signals of two different frequency bands are to be transmitted and/or received by the antenna device.

In a further implementation form, each of the first radiator and the second radiator is dual polarized.

The dual polarized first and second radiators enable the antenna device to operate at two different polarization orientations simultaneously. The dual polarized aspect enables achieving polarization diversity, which can increase the capacity and reduce the installation costs. Typically, this is because the use of dual polarization can reduce multipath fading and double the utilization rate of the frequency spectrum.

In a further implementation form, each radiator comprises four radiating elements arranged at +/−45 degrees.

The arrangement of the four radiating elements at +/−45 degrees enables similar radiating directions for the first and second radiations.

In a further implementation form, a radiating directions of the first radiator and the second radiator are parallel to the first axis.

By virtue of a radiating direction of the first radiator and the second radiator parallel to the first axis, the directivity of the antenna device is improved.

In a second aspect, the present disclosure provides an array of antenna devices, the array comprising one or more antenna devices of the first aspect.

The array of antenna devices of the second aspect achieves all the advantages and effects of the antennae device of the first aspect.

In a further implementation form, the array of antenna devices comprise one or more additional antenna devices configured to radiate a third electromagnetic signal in a third frequency band different from the first frequency band and the second frequency band.

The use of one or more additional devices in conjunction with the antenna device allows the antenna device to operate in multiple frequency bands (i.e. more than two frequency bands). This enables an improved overall capability of the antenna device and allows the antenna device to accommodate one or more antenna devices around itself without degrading the performance thereof.

In a third aspect, the present disclosure provides a base station comprising one or more antenna devices according to the first aspect.

The base station, of the third aspect, having the one or more antenna devices of the first aspect achieves all the advantages and effects of the antenna device of the first aspect.

It will be appreciated that all implementation forms discussed hereinabove can be combined. It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear to a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure are made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

a.

b.

c.

d.

e.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
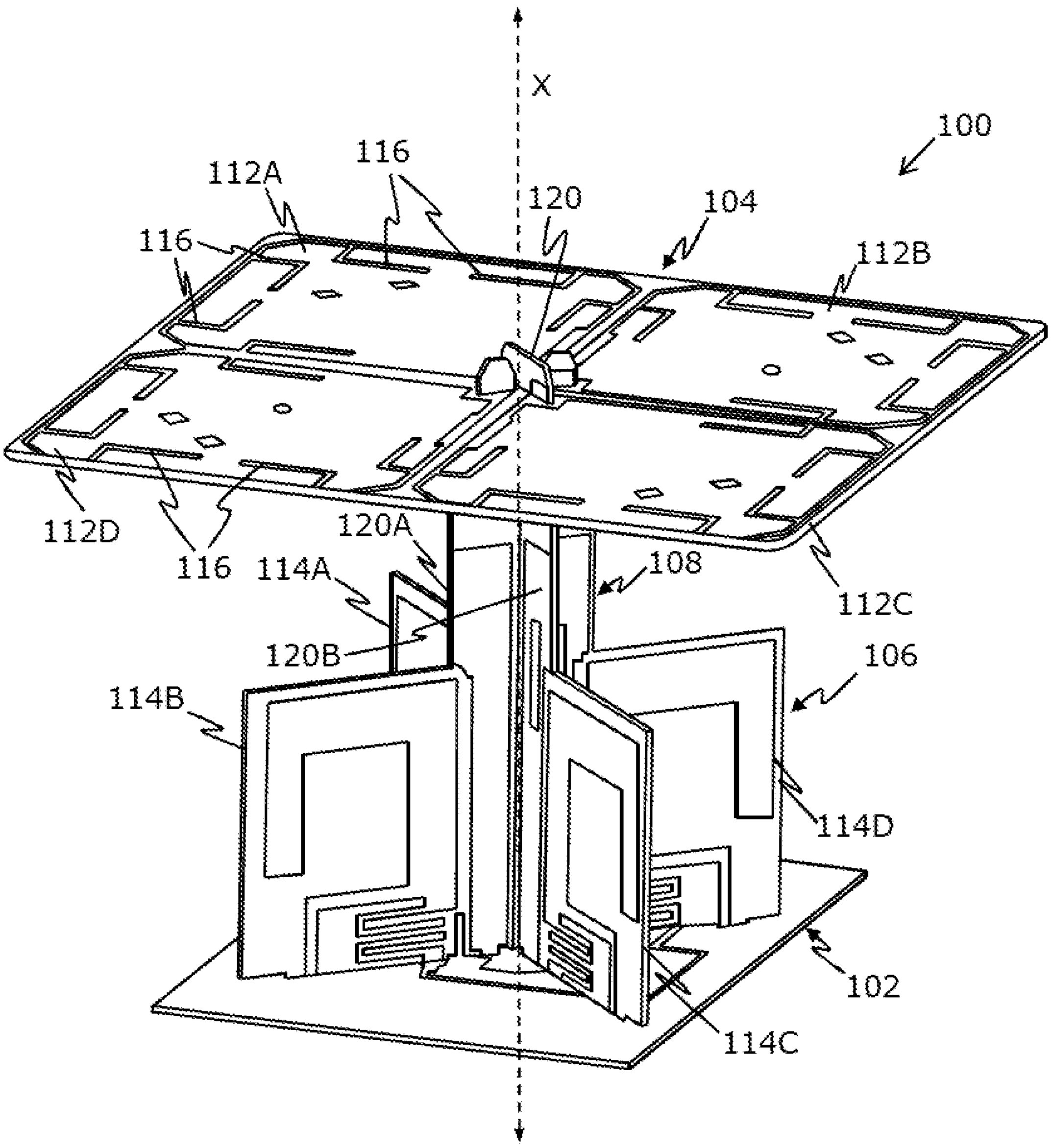
FIG. 1 is a perspective view of an antenna device, in accordance with an embodiment of the present disclosure.

FIG. 1 illustrates a perspective view of an antenna device 100, in accordance with an embodiment of the present disclosure. The antenna device 100 comprises a base plate 102 having a substantially planar shape. The antenna device 100 also comprises a first radiator 104. The first radiator 104 has a substantially planar shape parallel to the base plate 102. The first radiator 104 is supported by a first balun 108 extending along a first axis X between the base plate 102 and the first radiator 104. The first axis X is perpendicular to the base plate 102 and the first radiator 104. The antenna device 100 further comprises a second radiator 106. The second radiator 106 comprises one or more planar structures. For example, the second radiator 106 comprises a first planar structure 114A, a second planar structure 114B, a third planar structure 114C, and a fourth planar structure 114D (herein after collectively referred to as planar structures 114A-D). The planar structures 114A-D extend along the first axis X and arranged between the base plate 102 and the first radiator 104. The first radiator 104 comprises one or more co-planar structures, such as a first co-planar structure 112A, a second co-planar structure 112B, a third co-planar structure 112C, and a fourth co-planar structure 112D (hereinafter collectively referred to as co-planar structure 112A-D).

In an embodiment, the co-planar structures 112A-D are placed adjacent to one another. For example, the co-planar structures 112A-D are arranged in a grid formation and adjacent to one another such that the co-planar structures 112A-D collectively form a rectangular planar structure. Further, each of the co-planar structures 112A-D comprises one or more radiating elements, such as radiating terminals 116. In an example, each of the co-planar structures 112A-D includes a plurality of radiating terminals (for example, four or six radiating elements). For example, the co-planar structure 112A is shown to include the six radiating terminals 116, and similarly the other co-planar structures 112C-D includes six radiating terminals. The radiating terminals 116 are arranged on peripheral areas of each of the co-planar structures 112A-D. Specifically, the radiating terminals 116 are arranged on a peripheral area of the rectangular planar structure constituted together by the co-planar structures 112A-D. The radiating terminals 116 are essentially two identical conductive elements such as co-planar metal cables or metal rods or metal plates. In an example, the radiating terminals 116 are metal traces on a printed circuit board (PCB). Therefore, it will be understood that each of the co-planar structures 112A-D is a PCB. Further, the two conductive elements of each of the radiating terminals 116 are placed in a direction opposite to each other. It will be appreciated that the number of radiating elements and their orientations in the co-planar structures 112A-D may be varied without limiting the scope of the present disclosure.

According to an embodiment, the antenna device 100 of the present disclosure may also be termed as a radiating element, a radiating device, or an antenna element. The antenna device 100 is typically used for telecommunication. For example, the antenna device 100 may be used in a wireless communication system. Further, the antenna device 100 may be used alone or collectively as an array of such antenna devices in the communication system. Examples of such wireless communication system includes, but is not limited to, a base station (such as an Evolved Node B (eNB), a gNB, and the like), a repeater device, a customer premise equipment, and other customized telecommunication hardware.

The first radiator 104 is configured to radiate a first electromagnetic signal in a first frequency band. It will be evident that the first electromagnetic signal is radiated when the antenna device 100 is in operation. The 'electromagnetic signal' includes signal propagation by simultaneous periodic variations of electric and magnetic field intensity, which includes radio waves, microwaves, infrared, light, ultraviolet, X-rays, and gamma rays. The electromagnetic signal must occupy a range of frequencies carrying most of its energy, called its bandwidth. A frequency band may represent one communication channel or be subdivided into various frequency bands as per implementation, such as a first frequency band, a second frequency band and so forth. In an example, the first frequency band may be defined by a frequency range, i.e. 690 MHz to 960 MHz.

In accordance with an embodiment, the first radiator 104 may be a dipole antenna. The "dipole antenna" refers to the class of antennae producing a radiation pattern approximating that of an elementary electric dipole with a radiating structure supporting a line current so energized that the current has only one node at each end. In the present disclosure the aspect of a dipole antenna is defined or realized by radiating terminals 116 of the co-planar structures 112A-D. Generally, the dipole antenna (i.e. the radiating terminals 116) is defined by the two identical conductive elements of equal length, which are oriented end-to-end with a feedline (such as a metal wire for electrical connection) connected between them. Generally, the size of each conductive element is approximately a quarter of the wavelength of the desired frequency of operation.

In accordance with an embodiment, as shown in FIG. 1, the first radiator 104 has a planar structure with an opening 110 (or a cut-out, not shown) at a substantially central position of the first radiator 104. In an example, the opening is a cross-shaped slot for accommodating an end portion 120 of the first balun 108. However, it may be apparent that a shape of the opening may be of any other shape, such as circular, oval, rectangular, square, or any customised pattern for receiving and accommodating the end portion 120 of the first balun 108. It is to be understood that based on the shape of the opening an end portion (such as the end portion 120) of the first balun 108 may be configured to have a similar shape. The arrangement of the opening and the end portion 120 of the first balun 108 allows the first balun 108 to support the first radiator 104 thereon. Further, the first radiator 104 is spaced apart from the base plate 102, which simplifies the arrangement of an additional radiator (such as the second radiator 106) below the first radiator 104, thereby increasing the compactness of the antenna device 100 without any degradation of performance of the antenna device 100. The end portion 120 provides the support as well as feeds current to the first radiator 104 without increasing any additional parts in the antenna device 100.

As explained herein above, the antenna device 100 includes more than one radiator, such as the first and second radiators 104, 106. In such embodiments, electromagnetic signals are radiated concurrently by different radiators operating in different frequency bands (e.g. a high frequency band and a low frequency band). The first radiator 104 is a low band radiator, wherein the first frequency band corresponds to a lower frequency band as compared to a frequency band (such as the second frequency band) in which the second radiator 106 operates.

The second radiator 106 is configured to radiate a second electromagnetic signal in a second frequency band. The second radiator 106 comprises one or more planar structures, such as a first planar structure 114A, a second planar structure 114B, a third planar structure 114C, and a fourth planar structure 114D (collectively referred to as planar structures 114A-D). The planar structures 114A-D extend along the first axis X and are arranged between the base plate 102 and the first radiator 104. Further, as shown, the length of the planar structures 114A-D (along the first axis X) is less as compared to a length of the first balun 108, therefore the planar structures 114A-D are spaced apart from the first radiator 104 (particularly, from the co-planar structures 112A-D). Further, as shown, the planar structures 114A-D are coupled to the base plate 102. In an example, each the planar structures 114A-D includes at least one connecting tab, for example one or two connecting tabs, extending from the planar structures 114A-D, and the base plate 102 includes corresponding holes for receiving the at least one connecting tab therethrough for allowing snap-fit coupling between the planar structures 114A-D and the base plate 102. Alternatively, the planar structures 114A-D and the base plate 102 may be connected using connectors, such as brackets and screws, or may be integrally coupled to each other. The planar structures 114A-D are also coupled to the first balun 108, which is explained in greater detail herein later.

According to an embodiment, the planar structures 114A-D may be configured to have a rectangular shape. However, it is obvious that the shape of the planar structures 114A-D may vary without limiting the scope of the disclosure. For example, the planar structures 114A-D may be configured to have a square, an oval or any polygonal shape.

In one embodiment, the second radiator 106 is formed from any one of a printed circuit board, a board with a metal foil deposit, a folded metal sheet or a molded interconnect device. Typically, the planar structures 114A-D of the second radiator 106 may be formed using a printed circuit board (PCB), which may include at least the feed lines, radiating lines, impedance matching lines and so forth. In an example, the second radiator 106 (i.e. the planar structures 114A-D) may be implemented as a single layer printed circuit board, a multi-layer printed circuit board, a flexible PCB or a flexi-rigid PCB. Further, the second radiator 106 may be a formed using a folded metal sheet such as a metallic sheet of copper, aluminum, iron and the like. Furthermore, the second radiator 106 may be formed using a board or plate with a metal foil deposit. The board using the metal foil deposit is formed using metallization achieved by printing of conductive traces or pathways onto one or both sides of the board. The board can be a thermoplastic part, metallic board, semiconductor sheet and the like. Moreover, the printing of the conductive traces is performed using at least one of aerosol jet, inkjet, or screen printing. Moreover, the second radiator 106 may be formed using a molded interconnect device. The molded interconnect device refers to an injection molded thermoplastic part integrated with an electrical network. The molded interconnect device (MID) employs a thermoplastic substrate having an integrated electrical circuitry by metallization. The MIDs include at least the circuit board, housing, connectors, and connecting cables merged into one fully functional, compact device.

In will be apparent that the antenna device 100 is primarily made of PCBs, i.e. the base plate 102, the first radiator 104, the second radiator 106 and the first balun 108 all are typically made of PCBs. In an example, such PCBs may be multilayer printed circuit boards. Further, such multilayer PCBs may be arranged with filtering devices and power combiners to distribute power to different radiators.

According to an embodiment, the planar structures 114A-D of the second radiator 106 are arranged in a manner between the base plate 102 and the first radiator 104 such that the radiating electromagnetic signals (such as the first electromagnetic signal, the second electromagnetic signal) of each of the two radiators (i.e. the first radiator 104 and the second radiator 106) does not interfere with one another during operation. Notably, each of the planar structures 114A-D comprises the radiating element (will be explained later in greater detail) of the second radiator 106. Each of the planar structures 114A-D are arranged perpendicular to one another for enabling 180 degrees out of phase radiation. Moreover, the second radiator 106 includes dipole metallization for each of the planar structures 114A-D extending along the first balun 108. The ‘dipole metallization’ refers to the conductive coating or metallic deposit over the non-metallic surface. The metal of the conductive coating or metallic deposit includes at least one of, but is not limited to, copper, stainless steel, aluminum, galvanized steel, silicon and other such metals. Typically, each of the planar structures 114A-D acts as the high frequency radiating parts of the second radiator 106, which is explained in greater detail herein later.

According to an embodiment, the base plate 102 is a flat metal sheet or metal plate or a printed circuit board for supporting one or more elements of the antenna device 100 (such as the first balun 108 or the second radiator 106). The base plate 102 may be implemented as a single layer printed circuit board, or as a multi-layer printed circuit board such as double layer PCB, multi-layer PCB. Additionally, the base plate 102 may be a flexible PCB or a flexi-rigid PCB. Further, the base plate 102 may be formed using a folded metal sheet such as a metallic sheet of copper, aluminum, iron and the like. Furthermore, the base plate 102 may be formed using a board or plate with a metal foil deposit thereon. In an embodiment, the metal foil deposit in the base plate 102 may be formed using metallization achieved by printing or etching of conductive traces or pathways onto the surface of the board. The board can be a thermoplastic part, metallic board, semiconductor sheet and the like. The base plate 102 comprises the electrical circuitry of the antenna device including, but not limited to, the feed lines, the feeding nodes and similar electrical components.

As shown, the first balun 108 extends along the first axis X between the base plate 102 and the first radiator 104. The first axis X is perpendicular to the base plate 102 and the first radiator 104, and the first balun 108 is arranged to support the first radiator 104 thereon. The first balun 108 also supports the second radiator 106. According to an embodiment, the second radiator 106 is integrally formed with the first balun 108. The first balun 108 extends perpendicular to the base plate 102 to form a monolithic structure with the second radiator 106. For example, the second radiator 106 may be coupled with the first balun 108 via integral molding process. Optionally, the second radiator 106 may be detachably coupled to the first balun 108.

As shown, the first balun 108 is formed in a cross configuration of two intersecting planar structures, i.e. the first and second intersecting planar structures 120A, 120B, arranged orthogonal to each other. The first and second intersecting planar structures 120A, 120B are formed integrally with the planar structures 114A-D of the second radiator 106. In an embodiment, the first balun 108 includes slots or cut-outs (not shown) configured to accommodate at least a connecting portion extending from each of the planar structures 114A-D, allowing snap-fit coupling therebetween. Alternatively, the planar structures 114A-D may include slots or cut-outs and the first balun 108 may include a complementary connecting portion extending to enable snap-fit coupling therebetween. Additionally, the first balun 108 may be coupled to the planar structures 114A-D using brackets, screws and so forth. As shown, the first and third planar structures 112A-C are coupled to the first intersecting structure 120A, and the second and fourth planar structures 112B-D are coupled to the second intersecting structure 120B.

According to an embodiment, the first balun 108 of the antenna device 100 is a balancing unit configured to convert an unbalanced signal to a balanced signal. In operation, the first balun 108 provides a balanced signal as an output for the radiating terminals 116. It will be appreciated that the first balun 108, at an elementary level, is realized by means of metal deposition on the first and second intersecting planar structures 120A, 120B. In other words, the first and second intersecting planar structures 120A, 120B are PCBs having metal deposition therein, which allows the first balun 108 to provide the balanced signal as the input for the radiating terminals 116. Typically, the first balun 108 is operable to provide currents in equal magnitude and in opposite phase to the radiating terminals 116. The first balun 108 may also include one or more electrical components or electrical connections or feed lines having a certain amount of capacitance and inductance leading to a frequency wherein the electrical reactance caused by self-inductance and self-capacitance of the first balun 108 are in a state of resonance. It will be appreciated the first balun 108 may operate at the resonant frequency or at frequency greater or lower than the resonant frequency.

It will be appreciated that the radiators (such as the first radiator 104, the second radiator 106) operate at a given value of impedance or reactance of the electrical network for communicating input and output signals. Impedance matching of the antenna device 100 is necessary to avoid signal losses and glitches during operation. Herein, the grounding capacitor of the antenna device 100 is employed to perform antenna matching.

In an embodiment, the second frequency band does not overlap with the first frequency band. In other words, the first frequency band may be different from the second frequency band, and the difference therebetween may be substantial or non-substantial. Thus, the antenna device 100 is a dual band antenna device, i.e. configured to radiate electromagnetic signals in two frequency bands concurrently. In an example, any two frequency bands may be selected from the following ranges, such as from 690-960 MHz and 1.4 GHz-2.2 GHz, which may be radiated concurrently. Further, the first radiator 104 and the second radiator 106 may radiate electromagnetic signals in two frequency bands concurrently, and the two different frequency bands in operating range of mm Wave frequencies, or a combination thereof.

In an embodiment, the second frequency band is higher than the first frequency band, i.e. operating range of the second frequency band is higher than the first frequency band. Accordingly, the first radiator 104 operates in a lower frequency band and the second radiator 106 operates in higher frequency band. For example, the first radiator 104 may be operable in a range of 690-960 MHz and the second radiator 106 may be operable in a range of 1.4 GHz-2.2 GHz.

According to an embodiment, each of the first radiator 104 and the second radiator 106 is dual polarized. The term dual polarized means, each of the first radiator 104 and the second radiator 106 can respond to both horizontally and vertically polarized radio waves simultaneously. For example, each of the first radiator 104 and the second radiator 106 can transmit or receive both horizontally and vertically (i.e. along two directions perpendicular to each other) polarized radio waves simultaneously. In other words, each of the first radiator 104 and the second radiator 106 includes a pair of orthogonal radiation modes, which can be excited by a separate port in a single configuration. Further, the aspect of dual polarization allows the possibility to the first and second radiators 104, 106 to simultaneously function either as a transmitter or as a receiver, which increases communication channel capacity.

In an embodiment, each radiator, i.e. the first radiator 104 and the second radiator 106 comprises four radiating terminals arranged at +/−45 degrees. The term 'radiating element' refers to a unit of the antenna device 100 configured to radiate or receive electromagnetic signals. As shown in FIG. 1, the first radiator 104 comprises four co-planar structures 112A-D, and the second radiator 106 comprises four planar structures 114A-D. Therefore, each of the four co-planar structures 112A-D of the first radiator 104 and each of the four planar structures 114A-D of the second radiator 106 may be considered as a radiating terminal. However, each of the co-planar structures 112A-D and the planar structures 114A-D may include one or more radiating terminals. For example, each of the co-planar structures 112A-D includes six radiating terminals 116, and each of the planar structures 114A-D includes a single radiating terminal, i.e. the radiating arms 302A-D, respectively. Further, it may be evident that the term "radiating element" and the term "radiating terminal" may be generally referred to as a unit of the antenna device 100 configured to radiate or receive electromagnetic signals.

The radiating terminals are arranged at +/−45 degrees. As mentioned herein above, the four co-planar structures 112A-D and the four planar structures 114A-D are considered as the radiating terminal, therefore the co-planar structures 112A-D are arranged at +/−45 degrees to each other, and similarly the planar structures 114A-D are arranged at +/−45 degrees to each other. Typically, for the first radiator 104 to be dual polarized, the co-planar structures 112A-D are arranged at +45 degrees and at −45 degrees to the first axis X (shown in FIG. 1, i.e. a vertical direction). In such instances, the co-planar structures 112A and 112C positioned diagonal to each other may be considered as a pair of dipoles constituting a single polarization, and the co-planar structures 112B and 112D positioned diagonal to each other may be considered as another pair of dipoles providing the dual polarized aspect to the first radiator 104. Similarly, for the second radiator 106 to be dual polarized, the planar structures 114A-D are arranged at +45 degrees and at −45 degrees to the first axis X (i.e. a vertical direction, which alternatively can be a horizontal direction). The co-planar structures 114A and 114C positioned diagonal to each other may be considered as a pair of dipoles constituting a single polarization, and the co-planar structures 114B and 114D positioned diagonal to each other may be considered as another pair of dipoles providing dual polarized aspect to the second radiator 106. Therefore, the positioning or orientation of the four radiating elements (i.e. the co-planar structures 112A-D and the planar structures 114A-D) of each of the first radiator 104 and the second radiator 106, respectively, enables operation at two different polarization orientations simultaneously for the antenna device 100.

In accordance with an embodiment, a radiating direction of the first radiator 104 and the second radiator 106 is parallel to the first axis X. The term 'radiating direction' refers to a direction in which electromagnetic signals are propagated (i.e. sent or received) by the antenna device 100. As shown, the first radiator 104 (i.e. the co-planar structures 112A-D) is arranged along a plane perpendicular to the first axis X, and considering the antenna device 100 to be held in an upright direction (as shown in FIG. 1), the first radiator 104 is configured to radiate in a direction parallel (or along) the first axis X, i.e. in a vertical direction. The second radiator 106, i.e. the planar structures 114A-D are arranged along planes parallel to the first axis X, is also configured to radiate in a direction parallel (or along) the first axis X, i.e. in the vertical direction. It will be apparent that based on a direction in which the antenna device 100 is held, the radiating direction of the antenna device 100 may be altered. For example, the antenna device 100 may be arranged to radiate in a horizontal direction. Further, the antenna device 100 (i.e. the first and second radiators 104, 106) may be configured to radiate in a direction perpendicular to the first axis X. Moreover, the antenna device 100 may be configured to radiate in both the directions, i.e. perpendicular and parallel to the first axis X. In such instance the first and second radiators 104, 106 are configured to radiate perpendicular to each other.

In accordance with an embodiment, by virtue of having the first and second radiators 104, 106 arranged on the same printed circuit board, i.e. the base plate 102, the complexity (i.e. the structural as well as the manufacturing complexity) and size of the antenna devices 100 is significantly reduced. Moreover, such a compact arrangement of the first and second radiators 104, 106 on the same printed circuit board does not degrade the performance of any radiator and provides a capability to the antenna device 100 to concurrently support an increased number of frequency bands, which may help in increasing userbase.

Figure 2:
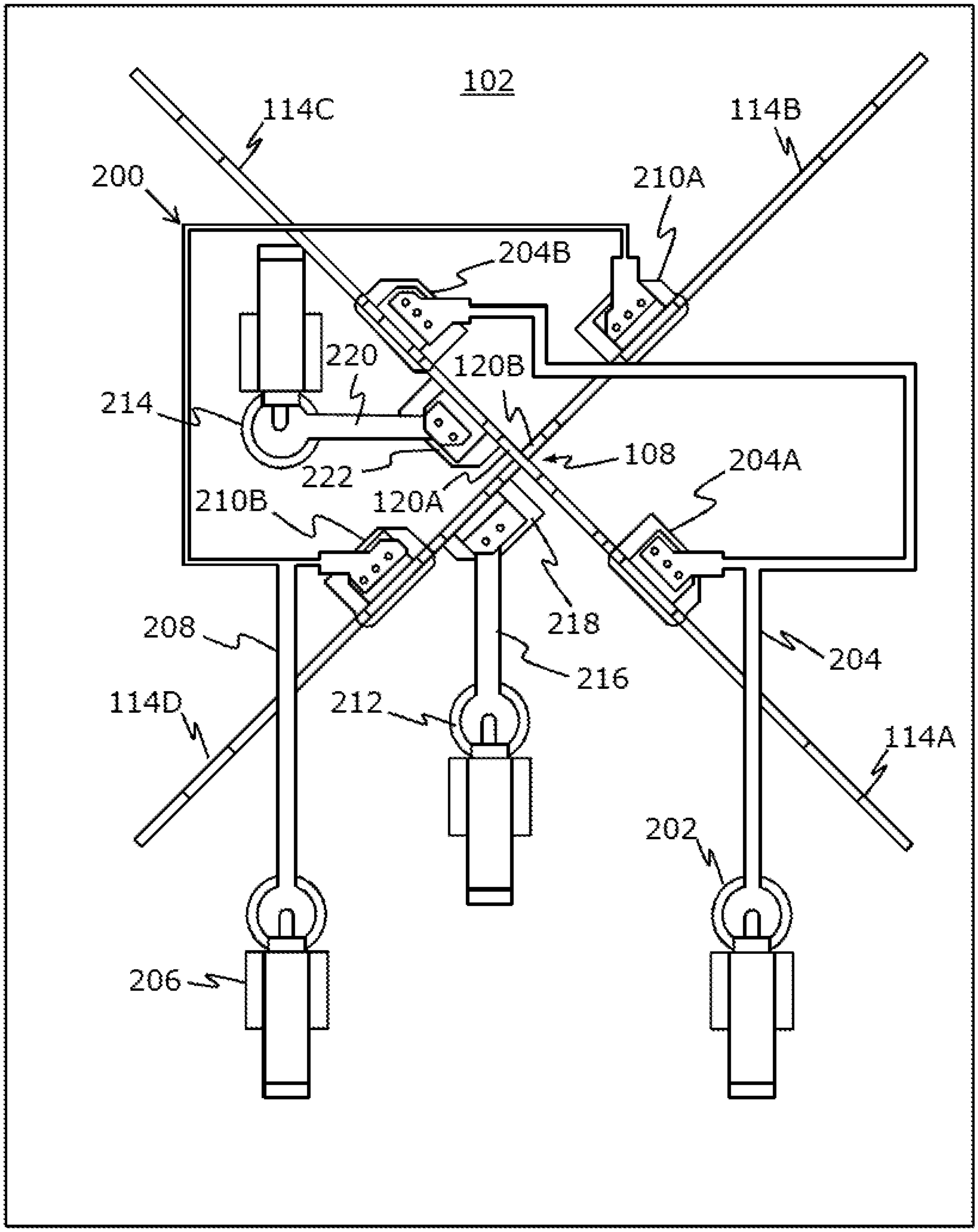
FIG. 2 is a top view of the antennae device of FIG. 1 with a first radiator thereof removed, in accordance with an embodiment of the present disclosure.

Referring now to FIG. 2, illustrated is a top view of the antenna device 100 of FIG. 1 with the first radiator 104 (shown in FIG. 1) thereof removed, in accordance with an embodiment of the present disclosure. Specifically, the FIG. 2 illustrates a top view of the second radiator 106 including a feeding arrangement 200 for the antenna device 100 of FIG. 1. As shown, the planar structures 114A-D arranged above the base plate 102. Further, as shown, the feeding arrangement 200 includes a first feeding node 202 electrically coupled to the first planar structure 114A and the third planar structure 114C via a first feed line 204, which bifurcates (uses a T-junction) and connects to the first and third planar structure 114A and 114C using feed line connectors 204A and 204B. Similarly, a second feeding node 206 is electrically coupled to the second planar structure 114B and the fourth planar structure 114D via a second feed line 208, which bifurcates (uses a T-junction) and connects to the second and fourth planar structure 114B and 114D using feed line connectors 210A and 210B. It will be appreciated that the first and second feeding nodes 202, 206, the first and second feed lines 204, 208, and the feed line connectors 204A-B and 210A-B are associated with the second radiator 106, i.e. configured to provide electrical energy for the second radiator 106 to radiate the second electromagnetic signal in the second frequency band. The feeding arrangement 200 also includes a third feeding node 212 and a fourth feeding node 214 connected to the first and second intersecting planar structures 120A-B, respectively, of the first balun 108. Specifically, the third feeding node 212 is coupled to the first intersecting planar structures 120A via a third feed line 216 and a feed line connector 218. Similarly, the fourth feeding node 214 is coupled to the second intersecting planar structures 120B via a fourth feed line 220 and a feed line connector 222. It will be appreciated that the third and fourth feeding nodes 212, 214, the third and fourth feed lines 216, 220, and the feed line connectors 218 and 220 are associated with the first radiator 104 (shown in FIG. 1), configured to provide electrical energy for the first radiator 104 via the first balun 108 to radiate the first electromagnetic signal in the first frequency band.

In an embodiment, the feeding arrangement 200, particularly, the first to fourth feed lines 204, 208, 216, 220, and the feed lines connectors 204A-B, 210A-B, 218 and 222 are made of a conductive material such as copper or aluminum. Beneficially, the first to fourth feed lines 204, 208, 216, 220 and the feed lines connectors 204A-B, 210A-B, 218 and 222 are laid on the base plate 102 to simplify the structural complexity of the antenna device 100. This precludes the need of additional components for the feeding arrangement 200, which can cause an undesirable intersection while providing electrical energy to the first radiator 104 and the second radiator 106. For example, additional components, such as co-axial cables, flex circuit traces, conductive housing structures, springs, screws, welded connections, solder joints, brackets, metal plates, or other conductive structures.

It will be apparent that the first balun 108 comprises one or more feed lines (not shown) for the first radiator 104. Each of the one or more feed lines is a conductive track (e.g. a metal wiring or track) laid on the first balun 108 for providing required electrical energy or signal to the first radiator 104. As shown in FIG. 2, it will apparent that the third and fourth feeding nodes 212, 214, particularly, the third and fourth feed lines 216, 220 and the feed line connectors 218 and 220 (shown in FIG. 3 as well) are electrically coupled to the one or more feed lines of the first balun 108 for providing required electrical power to the first radiator 104 (shown in FIG. 1).

Figure 3:
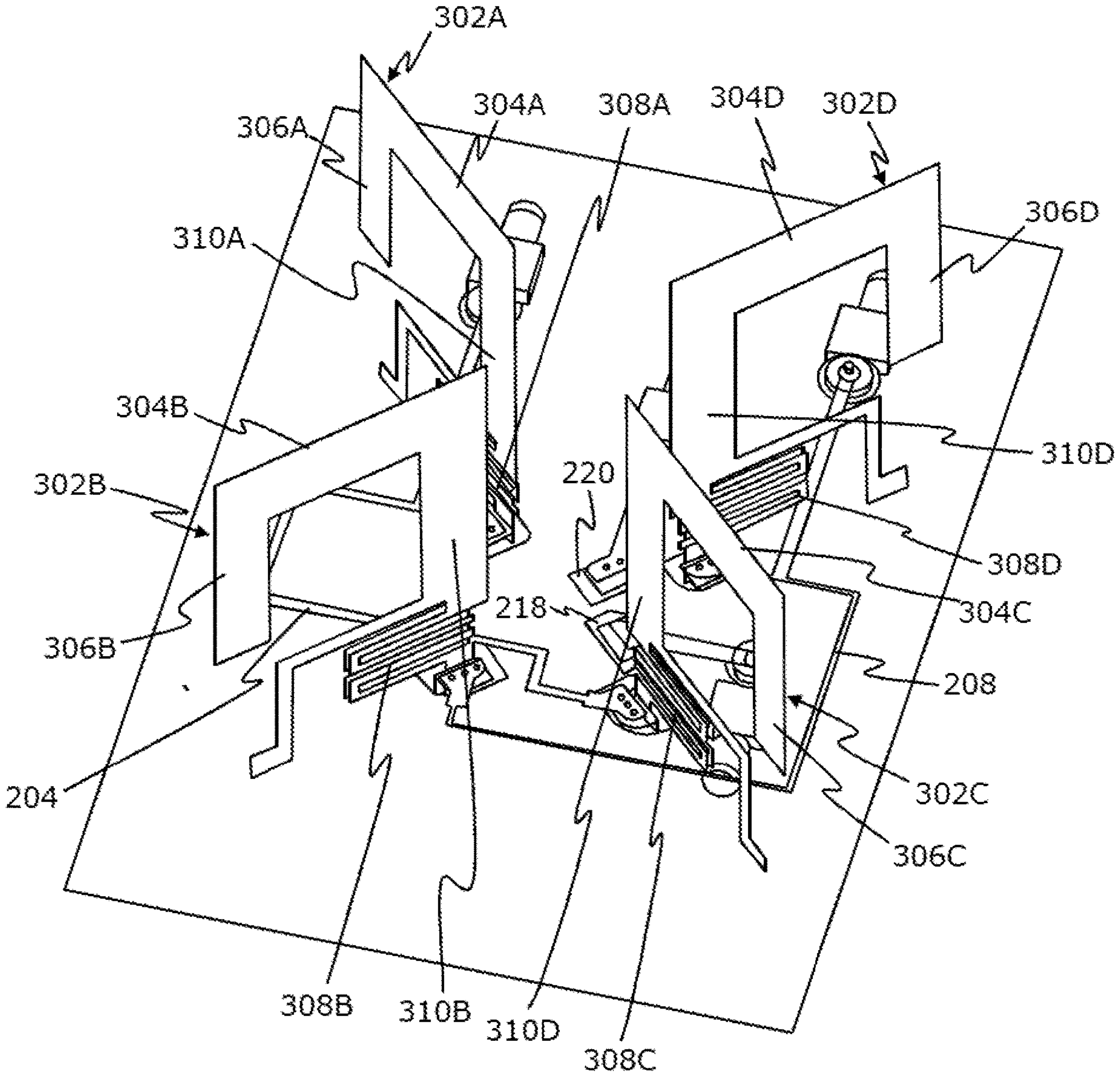
FIG. 3 is a perspective view of radiating arms of a second radiator of the antenna device of FIG. 1, in accordance with an embodiment of the present disclosure.

Referring now to FIG. 3, illustrated is a perspective view of radiating arms of the second radiator of 106 the antenna device 100 of FIG. 1, in accordance with an embodiment of the present disclosure. As shown, the second radiator 106 comprises a plurality of radiating arms namely a first radiating arm 302A, a second radiating arm 302B, a third radiating arm 302C, and a fourth radiating arm 302D, collectively referred to as radiating arms 302A-D. It will be evident that radiating arms 302A-D are associated with (i.e. configured on or carried by) the planar structure 114A-D (shown in FIG. 1), respectively. As shown, each of the plurality of radiating arms 302A-D comprises two portions. For example, each of the radiating arms 302A-D includes a first part extending radially outwards away from the first axis X (shown in FIG. 1), and a second part extending from an outer extent of the first part in a direction parallel to the first axis X. For example, the radiating arm 302A includes a first part 304A extending radially outwards away from the first axis X (shown in FIG. 1) and a second part 306A extending from the first part 304A in a direction parallel to the first axis X. Notably, the first portion 304A and the second portion 306A of the radiating arm 302A together form a L-shaped structure to occupy less overall space and reduce the physical footprint of the antenna device 100. Similarly, each of the radiating arm 302B-D includes the first part 304B-D, respectively, and the second part 306B-D, respectively. It will be apparent that the radiating arms 302A-D acts as the radiating element for the second radiator 106.

According to an embodiment, the second radiator 106 comprises a grounding capacitor arranged for capacitive grounding of the second radiator. Further, the grounding capacitor is formed from a conductive path extending across one or more of the planar structures 114A-D (shown in FIG. 1) of the second radiator 106 (shown in FIG. 1). As shown in FIG. 3, each of the radiating arms 302A-D of the second radiator 106 are coupled to a grounding capacitor, such as grounding capacitors 308A-D, respectively. As shown, the grounding capacitors 308A-D are formed from the conductive path, electrically coupled to the feeding arrangement 200, shown and explained in conjunction FIG. 2.

The grounding capacitors 308A-D are operable to ground unwanted high frequency signals via capacitive coupling. Typically, the capacitive coupling of the grounding capacitors 308A-D refers to providing a low impendence path for grounding the unwanted high frequency signals. Typically, the grounding capacitors 308A-D serve to reduce electric field susceptibility (that may be caused due to the high frequency feed), which in turn reduces interference on the output signals of the antenna device 100. For example, the grounding capacitors 308A-D act as a filter for the high frequency feed in the antenna device 100, i.e. to avoid any resonance in the multi-band. In other words, the grounding capacitors 308A-D enable the antenna device 100 to perform glitch-less and interference free communication.

According to an embodiment, a second balun is integrally formed with the second radiator 106. As shown in FIG. 3, the second radiator 106 includes the second balun, such as second baluns 310A, 310B, 310C and 310D (herein after collectively referred to as second baluns 310A-D) integrally formed with the second radiator 106. The second baluns 310A-D are elongated planar structures arranged to extend along the X axis (shown in FIG. 1). The second baluns 310A-D are coupled to the radiating arms 302A-D, respectively, at one end thereof, and to the grounding capacitor 308A-D at another end thereof. The second baluns 310A-D are operable to provide the balanced signal as the input for the radiating arm 302A-D, i.e. provide currents in equal magnitude and in opposite phase to the radiating arm 302A-D. The second baluns 310A-D typically includes metal deposition, i.e. may be implemented by means of PCBs having such metal deposition that allows them to provide the balanced input signal for the radiating terminals 116. It will be apparent that the second baluns 310A-D are operable to provide (or convey) required electrical connections or the operation of the second radiator 106.

Referring back to FIG. 1, the planar structures 114A-D of the second radiator 106 are shown to be rectangular structures carrying the radiating arms 302A-D, the grounding capacitor 308A-D, and the second baluns 310A-D. It will be evident that portions of the planar structures 114A-D apart from the radiating arms 302A-D, the grounding capacitor 308A-D and the second baluns 310A-D would act as supporting portions, providing structural rigidity or integrity to the second radiator 106. In such instance, the supporting portions may be made of only substrate materials for providing structural rigidity or integrity only. Otherwise, such supporting portions may also carry electrical or electronic components required for the operation of the second radiator 106.

According to an embodiment, each of the feed lines 204, 208 (best shown in FIG. 2) can be considered as a power combiner. As shown, the feed line (or power combiner) 204 is connected to the radiating arms 302A, 302C, and the feed line (or power combiner) 208 is connected to the radiating arms 302B, 302D. Further, the radiating arms 302A, 302C lay in a same plane spaced apart from each other, which allows the radiating arms 302A, 302C to realize 180° out of phase radiation. Accordingly, the radiating arms 302A, 302C are operable to have a specific polarization, such as a first polarization, i.e. a direction in which the electric field of a radio wave oscillates while it propagates through a medium. Similarly, the radiating arms 302B, 302D lay in a same plane spaced apart from each other, which allows the radiating arms 302B, 302D to also realize 180° out of phase radiation and operable to have a specific polarization, such as a second polarization. This makes the second radiator 106 provide dual polarization. During operation, the feed lines (or power combiners) 204, 208 are configured with a 180° delay for obtaining in-phase radiation of the propagated electromagnetic signals.

In an embodiment, the Radio-Frequency (RF) performance of the antenna device 100 may be read in light with various performance parameters, such as Voltage Standing Wave Ratio (VSWR) parameter and beam width. In an example, the simulation result for the RF performance for the first radiator 104 of the antenna device 100 may include the following results: VSWR <1.5 from 690 MHz to 960 MHz, and Horizontal 3 dB beam width=65°+3°. Further, the simulation result for the RF performance for the second radiator 106 may include the following results: VSWR <1.53 from 1427 MHz to 1535 MHz, with peak value of 2 at 1427 MHz, horizontal 3 dB beam width 60° at 1427 MHz and 58° at 2200 MHz.

Figure 4:
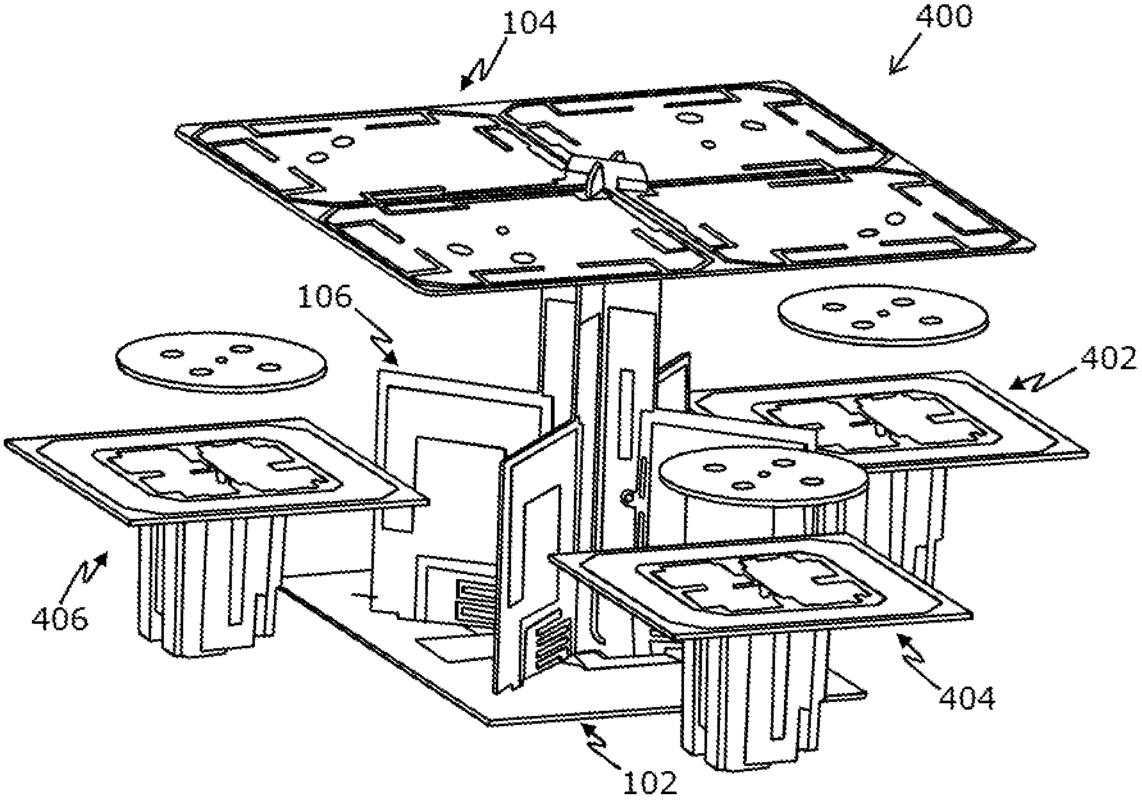
FIG. 4 is a perspective view of an antenna device, in accordance with another embodiment of the present disclosure.

Referring now to FIG. 4, illustrated is a perspective view of an antenna device 400, in accordance with another embodiment of the present disclosure. The antenna device 400 should be read in conjunction with the antenna device 100 (shown and explained in conjunction with FIG. 1). The antenna device 400 is substantially structurally and functionally similar to the antenna device 100, for example, the antenna device 400 also includes the base plate 102, the first radiator 104 and the second radiator 106. However, the antenna device 400 further comprises one or more additional antenna devices, such as antenna devices 402, 404 and 406 (which may be referred to third radiators). In the present embodiment, the antenna device 400 is shown to have three antenna devices 402, 404 and 406, alternatively, the antenna device 400 may be configured to have more or less such antenna devices, such as four or two antenna devices. In an embodiment, the antenna devices 402, 404 and 406 may be supported by the base plate 102 or alternatively may be arranged adjacent to the base plate 102.

The antenna devices 402, 404 and 406 are configured to radiate a third electromagnetic signal in a third frequency band different from the first frequency band and the second frequency band. Typically, the antenna devices 402, 404 and 406 are configured to radiate electromagnetic signals in a frequency band different from the first and the second frequency bands of the first and second radiators 104, 106, respectively. In an example, the third frequency band may be higher than the second frequency band. For example, the third frequency band may include a range of 1.6 GHz to 2.7 GHz. Accordingly, the antenna device 400 is configured to operate within multiple frequency bands (i.e., even more than two frequency bands) for example the first, second and third frequency band without causing any interference in such operating bands. The multi-band configuration enables a smaller footprint of antenna device 400 and allows integration of such a configuration in a multi-band environment, wherein a third frequency band can be placed without degrading the radiation and coupling performance. It will be appreciated that the antenna device 400 is a low-profile antenna, easy to assemble and has low coupling between different frequency bands. Further, the antenna device 400 is not limited to any specific combination of frequency bands. For example, one, two or more than two frequency bands of the antenna device 400 may operate together, having multiple (such as a high, a medium and a low) frequency bands interleaved between the first, second and third electromagnetic signals.

According to an embodiment, the simulation result for the RF performance for the antenna devices 402, 404 and 406 (such as the third radiators) of the antenna device 100 may include the following results: VSWR <1.53 from 1695 MHz to 2700 MHz, with peak value of 2.26 at 1890 MHz.

Figure 5:
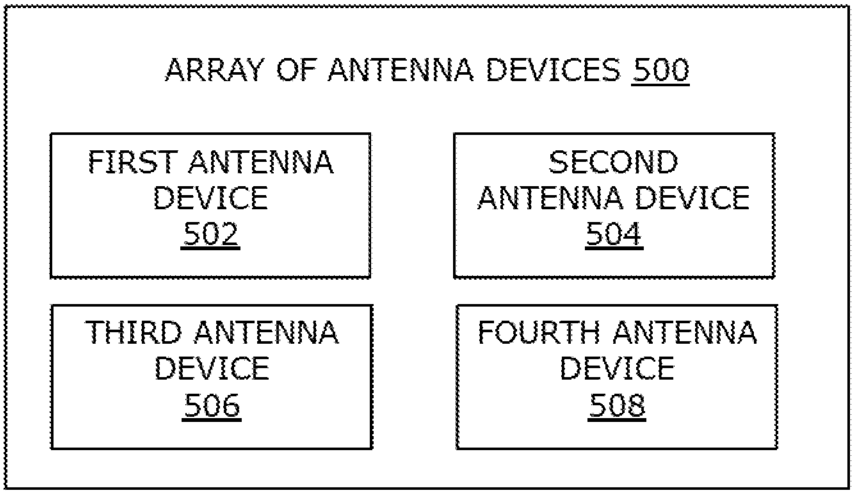
FIG. 5 is a block diagram of an array of antenna devices, in accordance with an embodiment of the present disclosure; and f.

Referring now to FIG. 5, illustrated is a block diagram of an array 500 of antenna devices, in accordance with an embodiment of the present disclosure. The array 500 of antenna devices should be read in conjunction with the antenna device 100 (shown and explained in conjunction with FIGS. 1-3). The array 500 of antenna devices includes a plurality of antenna devices arranged in an array or a grid form. For example, the array 500 of antenna devices include a first antenna device 502, a second antenna device 504, a third antenna device 506 and a fourth antenna device 508, each similar to the antenna device 100. The antenna devices 502-508 may be connected to a single receiver or transmitter by feedlines that feed the power to such antenna devices 502-508 in a specific phase relationship to work together as a single antenna. As mentioned herein, the antenna device 100 operates at dual frequencies, therefor the array 500 of antenna devices may be operable at one of the dual frequencies or both simultaneously. Accordingly, the array 500 of antenna devices may act as a single antenna or two antennae based on each section of one or two frequencies.

In another embodiment, the array 500 of antenna devices may comprise a plurality of antenna devices, such as the antenna device 100 and the antenna device 400 (shown and explained in conjunction with FIG. 4). In such an instance, the array 500 of antenna devices is operable at one or multiple frequencies bands (for example, the first, second and third frequency bands), i.e. with one, two or more than two frequency bands. Further, the plurality of antenna devices 502-508 of the array 500 of antenna devices may be connected to multiple receivers or transmitters via feedlines that feed the power to such plurality of antenna devices in a specific phase relationship to work together as a single antenna or multiple antennae.

Figure 6:
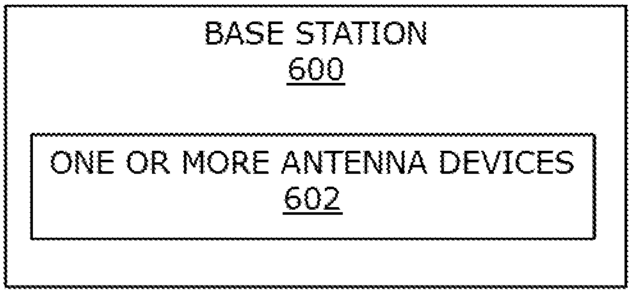
FIG. 6 is a block diagram of a base station, in accordance with an embodiment of the present disclosure.

Referring now to FIG. 6, illustrated is a block diagram of a base station 600 comprising one or more antenna devices, in accordance with an embodiment of the present disclosure. In an embodiment, the base station 600 comprises one or more antenna devices, such as the antenna devices 602, each similar to the antenna device 100 (shown and explained in conjunction with FIGS. 1-3). It will be apparent that the base station 600 further includes components or elements operatively associated with the antenna devices 602. In an example, such components or elements may include suitable logic, circuitry, and/or interfaces that may be configured to communicate with a plurality of wireless communication devices over a cellular network (e.g. 2G, 3G, 4G, or 5G) via the antenna devices 602. Examples of the base station 600 may include, but is not limited to, an evolved Node B (eNB), a Next Generation Node B (gNB), and the like.

In an embodiment, the base station 600 may include an array of antenna devices (e.g. the array 500 of antenna devices, shown and explained in conjunction with FIG. 5) that function as an antenna system to communicate with the plurality of wireless communication devices in an uplink and a downlink communication. Further, it will be apparent that the array 500 of antenna devices may comprise the antenna device 100 and the antenna device 400. Further, examples of the plurality of wireless communication devices include, but is not limited to, a user equipment (e.g. a smartphone), a customer premise equipment, a repeater device, a fixed wireless access node, or other communication devices or telecommunications hardware.

Modifications to embodiments of the present disclosure described in the foregoing are possible without departing from the scope of the present disclosure as defined by the accompanying claims. Expressions such as “including”, “comprising”, “incorporating”, “have”, “is” used to describe and claim the present disclosure are intended to be construed in a non-exclusive manner, namely allowing for items, components or elements not explicitly described also to be present. Reference to the singular is also to be construed to relate to the plural. The word “exemplary” is used herein to mean “serving as an example, instance or illustration”. Any embodiment described as “exemplary” is not necessarily to be construed as preferred or advantageous over other embodiments and/or to exclude the incorporation of features from other embodiments. The word “optionally” is used herein to mean “is provided in some embodiments and not provided in other embodiments”. It is appreciated that certain features of the present disclosure, which are, for clarity, described in the context of separate embodiments, may also be provided in combination in a single embodiment. Conversely, various features of the invention, which are, for brevity, described in the context of a single embodiment, may also be provided separately or in any suitable combination or as suitable in any other described embodiment of the disclosure.

What is claimed is:

1. An antennae array comprising:

a plurality of first antennae, each first antenna of the plurality comprising:

a base plate having a substantially planar shape;

a first radiator configured to radiate a first electromagnetic signal in a first frequency band, the first radiator having a substantially planar shape parallel to the base plate;

a first balun extending along a first axis between the base plate and the first radiator, wherein the first axis is perpendicular to the base plate and the first radiator, and the first balun is arranged to support the first radiator;

a second radiator configured to radiate a second electromagnetic signal in a second frequency band, the second radiator having one or more planar structures extending along the first axis and arranged between the base plate and the first radiator; and the antennae array further comprising a second antenna configured to radiate a third electromagnetic signal in a third frequency band different from the first frequency band and the second frequency band.

2. The antenna array of claim 1, wherein the second radiator is integrally formed with the first balun.

3. The antenna array of claim 1, wherein the second radiator comprises a grounding capacitor arranged for capacitive grounding of the second radiator.

4. The antenna array of claim 3, wherein the grounding capacitor is formed from a conductive path extending across one or more of the planar structures of the second radiator.

5. The antenna array of claim 1, wherein a second balun is integrally formed with the second radiator.

6. The antenna array of claim 1, wherein the second radiator is formed from any one of a printed circuit board, a board with a metal foil deposit, a folded metal sheet or a molded interconnect.

7. The antenna array of claim 1, wherein the first balun is formed in a cross configuration of two intersecting planar structures.

8. The antenna array of claim 1, wherein the first balun comprises one or more feed lines for the first radiator.

9. The antenna array of claim 1, wherein the second radiator comprises a plurality of radiating arms, each radiating arm including a first part extending radially outwards away from the first axis, and a second part extending from the outer extent of the first part in a direction parallel to the first axis.

10. The antenna array of claim 1, wherein the first radiator comprises one or more co-planar structures.

11. The antenna array of claim 1, wherein at least the base plate and the first radiator are formed from a printed circuit board.

12. The antenna array of claim 1, wherein the second frequency band does not overlap with the first frequency band.

13. The antenna array of claim 12, wherein the second frequency band is higher than the first frequency band.

14. The antenna array of claim 1, wherein each of the first radiator and the second radiator is dual polarized.

15. The antenna array of claim 14, wherein each radiator comprises four radiating elements arranged at +/−45 degrees.

16. The antenna array of claim 1, wherein a radiating direction of the first radiator and the second radiator is parallel to the first axis.

17. A base station comprising:

a plurality of first antennae, each first antenna of the plurality comprising:

a base plate having a substantially planar shape;

a first radiator configured to radiate a first electromagnetic signal in a first frequency band, the first radiator having a substantially planar shape parallel to the base plate;

a first balun extending along a first axis between the base plate and the first radiator, wherein the first axis is perpendicular to the base plate and the first radiator, and the first balun is arranged to support the first radiator;

a second radiator configured to radiate a second electromagnetic signal in a second frequency band, the second radiator having one or more planar structures extending along the first axis and arranged between the base plate and the first radiator; and the base station further comprising a second antenna configured to radiate a third electromagnetic signal in a third frequency band different from the first frequency band and the second frequency band.

18. The base station of claim 17, wherein the second radiator is integrally formed with the first balun.

19. The base station of claim 17, wherein the second radiator comprises a grounding capacitor arranged for capacitive grounding of the second radiator.

20. The base station of claim 17, wherein a second balun is integrally formed with the second radiator.

* * * * *